Nov. 16, 1954  A. MULLER  2,694,764
ELECTRIC ARC WELDING
Filed May 17, 1952  7 Sheets-Sheet 1

INVENTOR
ALBERT MULLER
BY
ATTORNEY

Nov. 16, 1954

A. MULLER 2,694,764

ELECTRIC ARC WELDING

Filed May 17, 1952

INVENTOR
ALBERT MULLER
BY
ATTORNEY

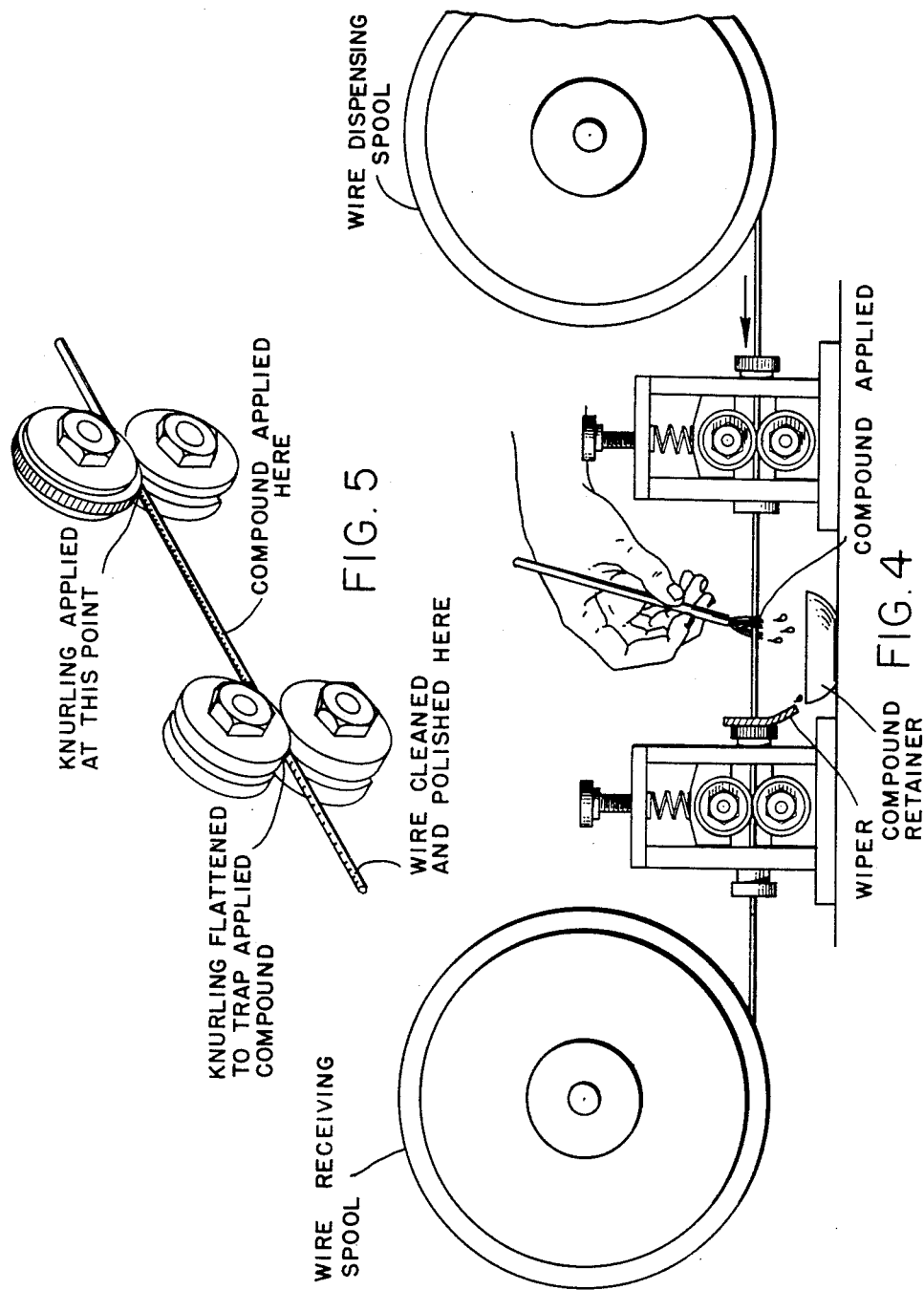

INVENTOR
ALBERT MULLER
BY
*H. Anne Mathew*
ATTORNEY

Nov. 16, 1954
A. MULLER
2,694,764
ELECTRIC ARC WELDING
Filed May 17, 1952
7 Sheets-Sheet 5
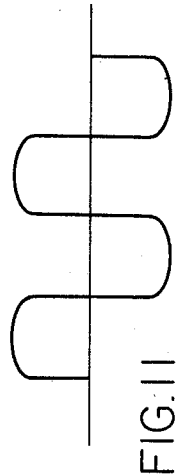
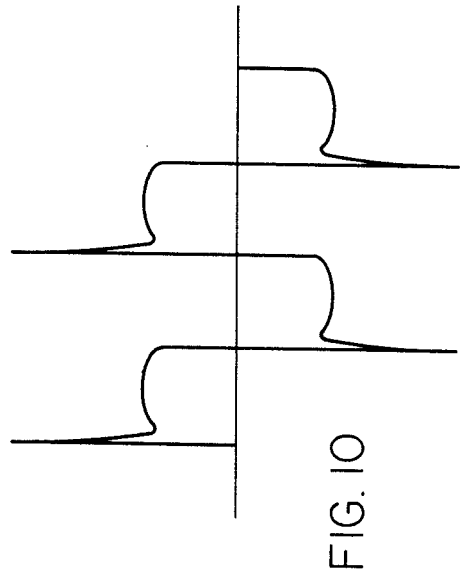
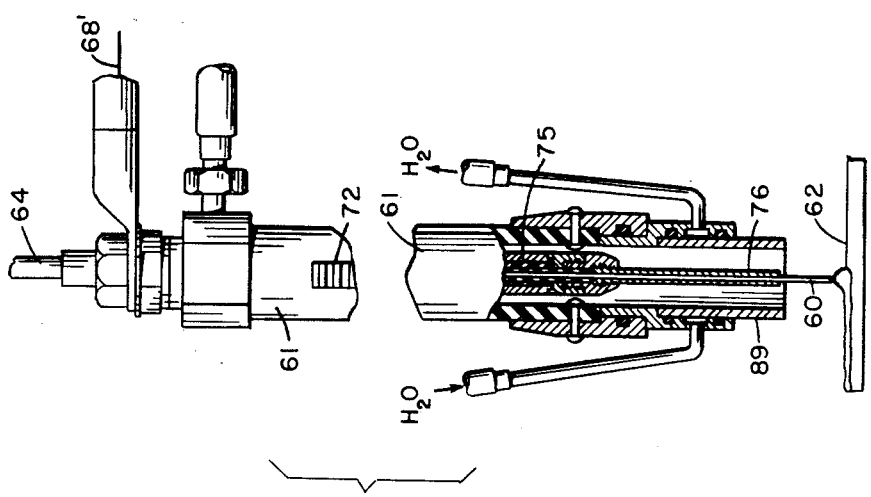
INVENTOR
ALBERT MULLER
BY
ATTORNEY Nov. 16, 1954  A. MULLER  2,694,764
ELECTRIC ARC WELDING
Filed May 17, 1952  7 Sheets-Sheet 6

INVENTOR
ALBERT MULLER
BY
ATTORNEY

# United States Patent Office 2,694,764
Patented Nov. 16, 1954

2,694,764

ELECTRIC ARC WELDING

Albert Muller, Plainfield, N. J., assignor to Air Reduction Company, Incorporated, New York, N. Y., a corporation of New York Application May 17, 1952, Serial No. 288,448

20 Claims. (Cl. 219—10)

This invention relates to gas shielded electric arc welding methods and apparatus and more particularly to methods and apparatus for inert gas shielded alternating current arc welding with a consumable or depositing electrode, referred to herein as inert gas shielded alternating current metal arc welding.

The present application is in some respects a division and in other respects a continuation-in-part of my co-pending application Serial No. 204,726, filed January 6, 1951, which in turn is a continuation-in-part of my prior application Serial No. 76,443, filed February 15, 1949, now abandoned. The inventive subject matter hereof can be considered in at least certain aspects to constitute a new and useful improvement in gas shielded metal arc welding methods and apparatus of the type disclosed in Muller et al. Patent No. 2,504,868, issued April 18, 1950; Mikhalapov Patent No. 2,544,711, issued March 13, 1951; and Muller et al. Patent No. 2,544,801, issued March 13, 1951; all assigned to the assignee of the present application.

In general, the new method of this application involves the addition to an inert gas shielded consumable electrode alternating current, welding arc of a substance or substances which act to improve the characteristics of the metal transfer from the consumable electrode to the workpiece; to improve the stability of the arc, and to control or alter in a desired manner those factors of the welding arc which determine the speed, efficiency and facility of the welding operation and the characteristics of the resulting weld.

The new apparatus of this application involves, in general, new articles and elements and new combinations thereof particularly designed to carry out the new methods referred to above.

Patents Nos. 2,504,868, 2,544,711, and 2,544,801 referred to above, disclose a welding operation of the type in which a consumable electrode wire is fed continuously to a gas shielded welding arc maintained between the electrode and a workpiece (plate), the welding current supplied to the arc being at least sufficient to consume the electrode as it is fed to the arc and transfer weld metal from the electrode to a weld deposit on the workpiece to form a commercially satisfactory weld, the current preferably being also supplied at a high current density sufficient to provide a smooth, fast and uniform deposit or "spray type" transfer (see Patent No. 2,504,868) of said electrode metal to the weld deposit. The shielding gas consists essentially of an inert gas. Inert shielding gas as used herein refers to the monatomic gases or mixtures thereof such as helium and/or argon and may include minor proportions of other gases that do not substantially alter the shielding characteristics of said monatomic inert gas or gases, preferably supplied as a substantially non-turbulent or laminar flow stream of sufficient "flow stiffness" to exclude substantially all the ambient atmosphere from the arc. Such an arc involves an electrical discharge through a controlled gas atmosphere. The gas in the arc gap is ionized and the resulting positive gas ions are impelled by the potential gradient toward the cathode where they yield their energy to the cathode or are neutralized by electrons emitted from the cathode. Metal vapor formed in the arc region by vaporization of the electrode, the plate (workpiece) or any other source such as a separate filler wire, forms part of the gas in the arc gap, so that the arc atmosphere through which the electrical discharge takes place and through which the weld metal transfers from the wire electrode to the plate comprises the inert shielding gas and said metal vapor, substantially all air, water vapor and other constituents of the ambient atmosphere being excluded by the inert gas shield. Since there is no flux, atmospheric air or similar impurity present as would be the case in welding in air, under a flux blanket, or with coated electrodes, the characteristics of such an arc, at a constant pressure, depend solely upon the characteristics of the plate and electrode metals and of the inert shielding gas.

In such "sterile" atmospheres considerable difficulty has been experienced in the alternating current metal arc welding of "cold cathode" materials. The principal factors have been arc instability and poor transfer of electrode metal to the workpiece. It has been possible under certain circumstances to stabilize alternating current arcs by the use of high open circuit voltages of about 150 volts and by superimposing a high frequency voltage cycle on the arc voltage or by both methods used simultaneously. These methods of stabilizing the alternating current arc, however, are not entirely satisfactory. The use of high open circuit voltages is hazardous and preferably avoided in customary commercial welding equipment and the auxiliary equipment needed for high frequency arc stabilization involves considerably more cost than conventional alternating current welding transformers. Furthermore, these methods have not improved sufficiently the metal transfer characteristics of the arc.

According to the present invention, it has been discovered that by providing certain addition substances in said arc (in addition to the metal which is melted to form the weld bead and the metal vapors thereof, and in addition to the inert shielding gas) the characteristics of the welding arc can be controlled or changed in a desirable manner. These addition substances are so selected and so added to the arc as to lower the work function of the cathode, improve arc stability, enable an alternating current arc to be maintained at normal low open circuit voltage, and provide a stable, concentrated cathode spot. It is believed that during the straight polarity half of the cycle while the electrode is the cathode, the stability is improved in part at least by concentration of the cathode spot in this manner so long as the drops or spray of molten metal, as it leaves the wire, is completely immersed in the plasma. The addition materials may also alter such factors as wire burn off rate, penetration, and size and contour of the weld bead.

An alternating current arc is extinguished and the electrodes are repeatedly reversed in polarity on each half cycle as the arc current and the arc voltage are reversed. The principal problem in welding with this type of arc arises out of the necessity for re-ignition of the arc at each half cycle. Each time the arc is extinguished it must be readily re-ignited to provide a smooth regular arc if a usable welding process is to be achieved. The re-ignition of the arc is dependent upon cathode emission and ionization of the arc column to conduct the arc current which are attained by imposing a sufficient re-ignition voltage across the electrode and the workpiece.

It has been found that when a material which is a good thermionic electron emitter at its welding temperature (i. e., a thermionic material) acts as a welding arc cathode it forms a very efficient cathode with a low cathode voltage drop. Such materials emit at their welding temperature, with a low cathode voltage drop, all the electrons needed by the arc. This effect is not present in the case of the relatively poor thermionic emitters or "cold cathode" materials, in which class fall most of the common structural materials such as aluminum, copper, nickel, iron, magnesium, titanium, etc., and alloys thereof normally welded commercially in large quantities. The electrode emission from "cold cathode materials" may be viewed from a simplified standpoint as being dependent principally upon "field emission." Such emission ceases abruptly each time the arc is extinguished or interrupted and requires a very high open circuit voltage sufficient to establish a glow discharge before the arc can be re-ignited. The re-ignition voltage comprises that voltage required to produce such glow discharge and to ionize the arc gap. The normal alternating, low open circuit voltages of about 75 volts are not sufficient to supply the necessary re-ignition voltage and therefore will not sustain an inert gas shielded alternating current metal welding arc with such cold cathode materials. A thermionic material, on the other hand, continues to emit electrons copiously by virtue of its temperature. Thus with an alternating current source it continues to emit electrons even after the current to the arc is extinguished due to the thermal lag in the electrode. In this case easy re-ignition of the arc is possible at normal low open circuit voltages. While the thermionic emission characteristic of the electrode and the workpiece, have been found to critically affect the arc stability, it is also essential in order to provide a suitable stabilized alternating current welding arc that the arc atmosphere be readily ionized.

The present invention provides for the modification of cold cathode welding electrode materials, in inert gas shielded metal arc welding to produce electrical and thermal arc characteristics that are similar to and/or which approach to a predetermined degree the electrical and thermal arc characteristics of thermionic welding electrode materials, at the temperatures occurring in the inert gas shielded consumable electrode welding arc. The electrical and thermal characteristics of an inert gas shielded metal welding arc between electrodes formed of cold cathode materials are thus controlled, such control being accomplished preferably through the addition of material to the arc which acts upon the arc cathode at the temperatures of the welding arc to improve the thermionic emission characteristic thereof and which promotes ionization of the arc atmosphere when necessary. It has been found that such additions may be made in minute amounts relative to the amount of deposited weld metal, or electrode wire consumed. The material added may be in such small amounts as to affect only the electrical and thermal characteristics of the arc. It can, if desired, be so selected, and used in such small quantities, as to have no substantial or appreciable effect on the chemical composition of the weld metal, or appreciable reaction with the metal being welded.

Welding arcs to which additions are made according to this invention are preferably those having a substantially "sterile" arc atmosphere or environment consisting essentially of inert shielding gas and such metal or like vapor as boils off the electrode, and workpiece. The non-turbulent inert shielding gas stream substantially excludes the ambient atmosphere from such welding arc and, because the welding process is a fluxless one, the electrical and thermal characteristics of such arcs depend solely upon those of the shielding gas and the metal of the electrodes. Fluxless, sterile, consumable bare electrode welding arcs of this character have different electrical and thermal properties than welding arcs in air, welding arcs formed under a submerged flux blanket, or those formed with the conventional flux coated electrodes. It has been found, according to the present invention, that the electrical and thermal characteristics of such inert gas shielded consumable electrode welding arcs can deliberately be varied and controlled to provide new and improved types of welding. The relatively pure, sterile inert gas environment insures that the added control substances will act upon or with, or will modify the arc electrode surfaces and/or the arc atmosphere in the manner and to the extent desired without loss of the beneficial effect of the inert shielding gas and without either loss of control or undesired further modification of electrical and thermal properties that might result from the presence of impurities such as air or fluxes and coatings which are present in conventional welding in air, under a flux blanket, and with coated electrodes.

One of the objects of the present invention is to provide a commercially practicable method of inert gas shielded, alternating current, metal arc welding at normal low open circuit voltages without electrical stabilization.

Another object is to provide means for improving the metal transfer characteristics and the stability of the inert gas shielded consumable electrode alternating current welding arc.

A further object is to obtain better arc stability in inert gas shielded alternating current metal arc welding particularly where inert shielding gases of relatively poor ionization properties such as helium are used.

Still other objects, results and advantages of the invention will be understood by and apparent to those skilled in the art upon considering the following detailed description and explanation of certain presently preferred embodiments of the invention and from the accompanying drawings in which:

Fig. 4 illustrates schematically a method and apparatus for making additions to a welding electrode wire for the purpose of the present invention.

Fig. 5 illustrates, on a somewhat enlarged scale, the welding wire as it appears during the various steps of preparation illustrated in Fig. 4.

Fig. 7 is an enlarged view, partially in section and partially broken away of the machine type welding gun forming part of the apparatus of Fig. 6.

Fig. 10 represents a reproduction of an oscilloscope trace of the arc voltage of an alternating current inert gas shielded, metal welding arc using a high open circuit voltage, illustrating the very high re-ignition voltage required without the practice of this invention.

Fig. 11 represents a reproduction of an oscilloscope trace of the arc voltage of an alternating current inert gas shielded metal welding arc illustrating the elimination of the very high re-ignition voltage obtained by practicing this invention.

Figure 1:
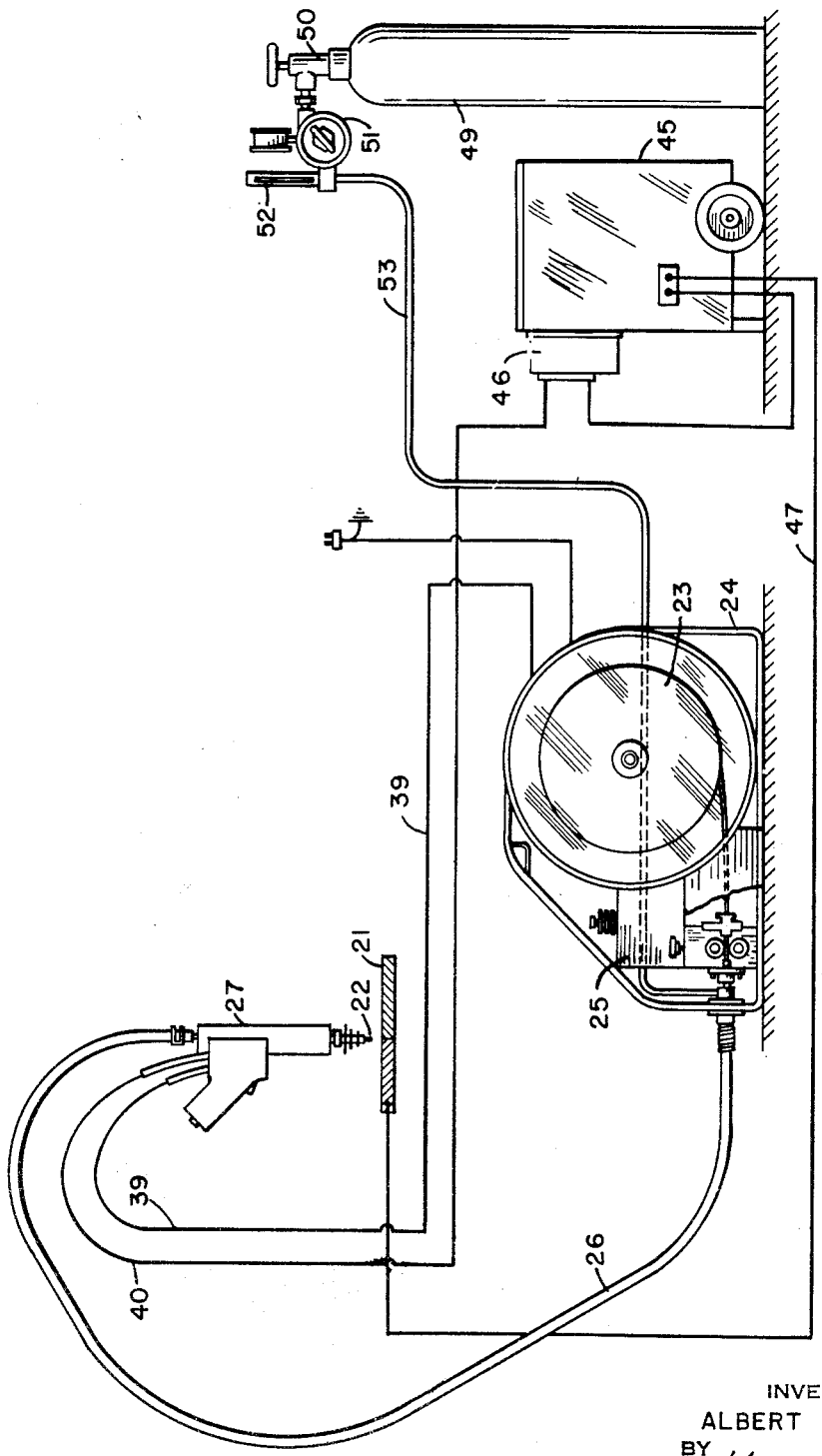
Fig. 1 illustrates diagrammatically an apparatus suitable for the practice of the invention.
Figures 2, 3:
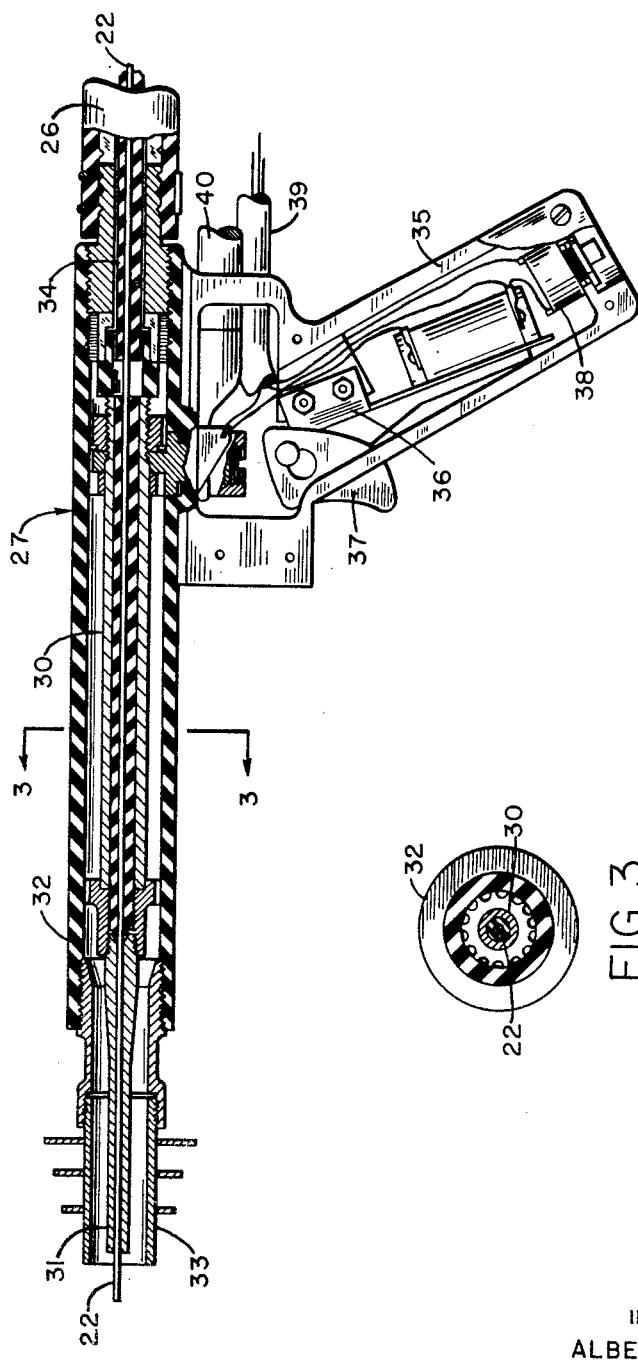
Fig. 2 is a cross-section showing in detail the actual structure of the inert gas shielded metal arc welding manual gun which forms part of the apparatus of Fig. 1.
Fig. 3 is a cross-section on the line 3—3 of Fig. 2.

Referring to Fig. 1 the work or plate to be welded is designated 21. The welding electrode 22 is supplied preferably in the form of a long length of wire dispensed from a reel 23 mounted within a frame 24. Motor driven feed mechanism 25 withdraws the wire from the reel and pushes it continuously, at a selected feed rate equal to the electrode burn off rate, through a flexible casing 26 to a welding gun 27. The wire reel and reel support, and the feed mechanism may be of the type disclosed in Anderson application Serial No. 182,488, filed August 31, 1950, now U. S. Patent 2,681,401, granted June 15, 1954. The flexible casing and the welding gun may be of the type disclosed in Anderson application Serial No. 209,430, filed February 5, 1951, now U. S. Patent 2,659,796, granted Nov. 17, 1953. The welding gun and casing are best shown in Figs. 2 and 3. Briefly described, the gun comprises an inner barrel assembly 30 through which the electrode wire 22 is fed. The electrode wire enters the inner barrel 30 from casing 26 and is delivered to contact tube 31 where the welding current is introduced. The wire passes from the contact tube 31 directly to the arc where it is melted or consumed and transfers to and is deposited in the weld puddle or crater on the plate. An outer barrel assembly 32 terminating in a nozzle 33 surrounds the inner barrel assembly and the contact tube. The annular space between the inner and outer barrels and between the contact tube and the nozzle forms a gas passage for the flow of inert shielding gas to the arc region. The gas supply system will be more fully disclosed hereinafter, but shielding gas is delivered by the casing 26 to the gun gas passage 34. The gas emerges from the gas nozzle as a substantially non-turbulent flow stream to shield the end of the electrode, the arc, and the weld puddle. Mikhalapov Patent No. 2,544,711, issued March 13, 1951, and Muller-Gibson Patent No. 2,544,801, issued the same date, disclose in detail preferred ways of forming the substantially non-turbulent gas shield. The remainder of the gun of Fig. 2 comprises a handle portion 35 in the form of a pistol grip. This handle portion contains a control switch 36 actuated by a trigger 37. This switch preferably is connected to give the operator thereof control of the welding current flow, the shielding gas flow, and the wire feed mechanism. The electrical leads to this control switch 36 and an auxiliary wire feed control switch 38 are united in control cable 39. Welding current is conducted to the gun through welding cable 40.

The welding current may be provided by a conventional alternating current welding transformer 45. One terminal of the welding transformer is electrically connected to the work by conductor 47 and the other terminal is electrically connected by the conductor in cable 40 to the welding gun and contact tube 31 through which the current is transferred to the wire electrode. A contactor 46 is preferably included for opening and closing the welding circuit.

Inert shielding gas is supplied from a high pressure gas cylinder 49 equipped with a cylinder valve 50, a pressure-reducing valve 51, and a flowmeter 52. Conduit 53 carries the gas to the trailer end of casing 26.

In operation, the shielding gas flow is preferably established prior to striking the arc. The welding transformer may be actuated before or after the shielding gas flow is established. The electrode is then touched to the work and withdrawn to establish the arc. The wire feed is started simultaneously with, or immediately prior to, the establishment of the welding arc and the wire is fed toward the work continuously at a rate to maintain the arc. Muller et al., Patent No. 2,504,868, issued April 18, 1950, describes in detail a suitable mode of operation of the apparatus of Figs. 1, 2, and 3.

The following examples are representative of the manner in which the invention has been practiced:

EXAMPLE I

Tests were made with a mild steel plate workpiece (3/8 inch thick) and a 1/16 inch diameter mild steel wire having a superficially applied addition of rubidium carbonate. The apparatus used was of the type disclosed above and illustrated in Figures 1, 2 and 3. Welding grade argon was used as the shielding gas at a flow rate of 75 cubic feet per hour through a 1 inch diameter nozzle.

The rubidium carbonate was applied to the wire as follows (Figures 4 and 5). The wire was first prepared by passing it through a pair of rolls, one of which was knurled, to form transverse impressions (about .005 inch deep and spaced apart by about 1/32 inch) on its surface (Figure 5). The rubidium carbonate, in the form of a dry powder, was made into a slurry or paste by mixing it thoroughly with a quantity of denatured alcohol. This slurry or paste was then applied to the wire by brushing it onto the surface (Figure 4) and into the transverse impressions on the wire surface. Following this step the wire was passed through a tightly-fitting annular rubber squeegee to remove the excess slurry. Next the wire was passed through a pair of smooth surfaced semi-circularly grooved rolls to smooth the surface roughness caused by the knurled roll and trap some of the addition material in the impressions. The surface of the wire was then wiped with a clean dry cloth to remove substantially all the rubidium carbonate except that which was trapped or impressed by the above treatment into the electrode surface. The alcohol evaporated leaving the wire dry. When prepared in the manner described, the wire has a substantially bare, electrically conductive surface and it can be readily fed through the welding apparatus; its ability to pick up the welding current from the contact tube is unimpaired. Since rubidium carbonate is a deliquescent material it may absorb considerable moisture when exposed to a humid atmosphere. This may result in some undesirable corrosion of the electrode wire which might interfere with the welding current transfer to the wire and which may also produce mechanical binding in the contact tube, because of a build up therein of the corrosion products. Also, the water present (hydrogen) has an adverse effect on the soundness of the weld deposit. However, this problem is easily avoided by keeping the dry prepared wire in a dry atmosphere. A compound of rubidium having substantially the same effect on the heat balance of the arc as the carbonate, but which is not as deliquescent, is the oxide.

A weld was made with the prepared electrode using 75 volts open circuit voltage and an arc voltage of 23 volts and arc current of 320 amperes as read off conventional A. C. meters. The wire burn off rate was 178 inches per minute. Identical conditions for several tests were maintained by mounting the welding gun in a fixed bracket and moving the workpiece mechanically under the gun at the desired relative weld travel speed. In these tests the weld travel speed was maintained at 10 inches per minute.

The operation carried out in the above described manner resulted in a stabilized alternating current arc operable at a low open circuit voltage of 75 volts. A good alternating current type metal arc spray transfer was observed with good regulation, moderate cleaning action and a well rounded weld bead.

To demonstrate how effectively the minute amounts of rubidium carbonate contributed to the stabilization of the alternating current arc an attempt was made to weld with a clean bare wire of the same diameter at an open circuit voltage of 75 volts, and without auxiliary electrical stabilization. It was not possible to strike or maintain an arc under these conditions.

EXAMPLE II

Similar tests were made, with the same apparatus, using barium oxide which was applied to a 1/16 inch mild steel wire in the same manner as above. The tests were made on a 3/8 inch thick mild steel plate and a protective gas shield was produced by delivering 50 cubic feet per hour of argon through a 3/4 inch nozzle. A weld was made using an open circuit voltage of 75 volts, 20 volts arc voltages and 325 amperes arc current. The wire burn off rate was 164 inches per minute and the weld travel speed was held at 10 inches per minute.

The operation carried out in this manner resulted in a stabilized alternating current arc operable at a low open circuit voltage of 75 volts. A good alternating current type spray transfer was observed with light spatter close to the bead. The bead formed was rounded with good penetration and no porosity.

As an alternative to the preparation method of Figure 4 in which the material is applied to the surface of the wire or imbedded in surface indentations therein, the addition material may be added to the melt when the wire is being manufactured, to form an alloy or mixture therewith. This provides homogeneous distribution of the addition material through the wire and eliminates the need for separate processing of the wire subsequent to its manufacture in wire form.

EXAMPLE III

For example, misch metal was added to a 95 pound heat of molten mild steel in an amount of 4 pounds of misch metal per ton of molten steel. Misch metal consists of 52% cerium, 33% lanthanum, 1.5% iron, and the balance rare earths. The resultant alloy (some of the misch metal was lost through vaporization) was drawn into 1/16 inch diameter wire which was used as a consuming electrode in an inert gas shielded metal arc welding process of the type here under consideration with alternating current. With an argon shielding gas flow of 75 cubic feet per hour through a 1 inch diameter nozzle a weld was made on a 3/8 inch thick steel plate at a weld travel speed of 10 inches per minute. At an arc welding current of 320 amperes, an arc voltage of 24 volts and 75 volts open circuit voltage the wire burn off rate was 140 inches per minute.

The operation carried out in this manner resulted in a stabilized alternating current arc operable at a low open circuit voltage of 75 volts. A good alternating current type spray transfer was observed with good regulation. No spatter was apparent.

EXAMPLE IV

It has been found that similar results can be produced by making additions according to the invention to a non-ferrous electrode wire. For example, aluminum can be welded with alternating current according to the invention by making an addition of rubidium carbonate to an aluminum electrode wire as shown by the following. A weld was made on an alumnium alloy plate with an aluminum alloy electrode, using welding grade argon as a shield gas delivered as a non-turbulent flow stream at 75 cubic feet per hour through a 1 inch diameter nozzle. The apparatus was substantially the same as that illustrated in Figs. 1, 2 and 3 and described hereinbefore. The electrode wire was a 1/16 inch diameter 43S aluminum wire having applied thereto, in the manner illustrated in Fig. 4, a small amount of rubidium carbonate. The plate on which the weld was made was 61ST aluminum 3/8 inch thick. The weld travel speed was 10 inches per minute. The rubidium carbonate was applied to the wire in exactly the same manner described hereinbefore for the application of this addition material to the steel wire. Under these conditions and an open circuit voltage of 75 volts, the arc voltage was 17 volts the arc current was 300 amperes and the wire burn off rate was 310 inches per minute.

The operation carried out in this manner resulted in a stabilized alternating current arc operable at a low open circuit voltage of 75 volts. A good alternating current type spray transfer was observed with good regulation. An oval contour bead was formed.

It has been found that very small amounts of the addition materials are required to effect the desired results. It is clear from the preceding description of two methods of application of the material to the wire which has been found satisfactory, that very little of the addition material remains on or in the wire in its finished, treated state. As a matter of fact, in the case of applying such material to the wire surface, difficulty may be encountered in feeding the wire through the contact tube and transferring current to it if the added material is on the surface of the wire in sufficient quantity to rub off. An approximate chemical analysis of a sample of the barium oxide treated steel wire used successfully in the example listed above, indicated that the barium oxide was present in the approximate amount of .055 pound per ton of steel, i. e., about .003% by weight of deposited weld metal, which is indicative of the fact that very small amounts of addition materials may be used. The treated wire can still be considered as a "bare" wire, and its surface is electrically conductive for pickup of the welding current as it is fed through the contact tube.

While certain specific addition materials for increasing thermionic emission have been included in the above examples, as illustrative of the operation and results of the invention, it is to be understood that the invention is not limited to said specific materials. Rather it is contemplated that the invention may be carried out with other addition materials which comprise or contain an emission agent or agents that cooperate with the electrode wire and workpiece base metal which act alternately as the arc cathode to form in each case a composite metal welding cathode surface which has a substantially higher thermionic emissivity at the welding temperature than the base metal alone and which are also effective to facilitate ionization of the arc gap. The increased thermionic emissivity of such a composite metal cathode surface is manifested by a substantially lower cathode voltage drop as compared to the work function and cathode voltage drop of the base metal alone, at the welding temperature. The composite welding cathode surface comprises both the emission agent or agents and the cathode base metal. Base metals are, of course, the metals which form the workpiece or the metals which form the wire electrode and which are provided for fusion with the workpiece metals to form the weld deposit. The emission agents are metals added to the arc or to the welding electrodes in extremely small amounts (either as elements or in compounds which dissociate to liberate such elements in the arc) primarily for the purpose of altering the thermal and electrical characteristics of the arc. Base metals in a given welding operation are determined by the composition of the workpiece to be welded and by the composition of the weld deposit to be formed. Suitable emission agents are metals which should be electropositive with respect to the cathode base metal, they should have a low thermionic work function (lower than the work function of the base metal) and have a low ionization potential (their ionization potential preferably should be lower than the ionization potential of any of the other constituents of the arc atmosphere and preferably lower than the effective work function of the cathode base metal), and they should have a melting point lower than the boiling point of the cathode base metal and yet be sufficiently high boiling or non-volatile as to remain in place in the composite cathode surface for a sufficient length of time to increase thermionic emission of the composite cathode surface under welding conditions. Since the electrode and the workpiece in the alternating current arc are repeatedly reversed in polarity so that both the electrode and workpiece acts alternately as the cathode it is apparent that the emission agent must be effective, in accordance with the above, at both places in order to stabilize the alternating current arc. It has been determined from experimental results that the invention may be very effectively carried out with an emission agent which is an element selected from the group consisting of the alkali metals, the alkaline earth metals, lanthanum and the lanthanum series rare earth metals, actinium and the actinium series rare earth metals, scandium and yttrium. These elements can be added either in elemental or metallic form or in the form of compounds thereof which will either partially or wholly dissociate in the arc to liberate the said elements. For example, the oxides, carbonates, borates, phosphates, nitrates, silicates, or halides, of said elements can be used. Mixtures of two or more of said elements and/or compounds may be used and are often particularly effective. The alkali metals are lithium, sodium, potassium, rubidium, cesium and francium. The alkaline earth metals are calcium, barium, strontium and radium. Lanthanum series rare earths are cerium, praseodymium, neodymium, promethium, samarium, europium, gadolinium, terbium, dysprosium, holmium, erbium, thulium, ytterbium, lutecium. Actinium series rare earth metals are thorium, protactinium, uranium, neptunium, plutonium, americium, and curium.

Many of the elements and compounds thereof in the periodic groups listed immediately above are rare and expensive, and some are dangerously radioactive. Therefore, it is preferred both for practical reasons and also because particularly beneficial and highly desirable results may be obtained therefrom in the inert shielded metal arc welding of the common structural metals to use an emission agent which is an element selected from the group consisting of potassium, rubidium, cesium, strontium, barium, lanthanum, or lanthanum rare earth mixtures and cerium; thorium and uranium may be preferred in some instances, where the welding electrode temperatures are high. Again, these preferred emission agents may be added either in elemental form or in the form of compounds thereof which will wholly or partially dissociate in the arc to liberate said elements. For example, the oxides, carbonates, borates, phosphates, nitrates, silicates, or halides of said elements can be used. Mixtures of two or more of said preferred elements and/or compounds may be used and are often particularly effective.

Specific examples of presently preferred addition materials are cesium nitrate, rubidium carbonate, cesium-rubidium chloride, barium oxide or carbonate, barium-strontium mixtures in the form of oxides or carbonates, lanthanum and lanthanum series rare earth mixtures in metallic and oxide forms, thorium oxide and potassium carbonate.

The materials indicated above which are delivered to the arc in accordance with the invention are effective to stabilize the alternating current arc formed between an electrode and a workpiece of cold cathode material by reduction of the re-ignition voltage. The re-ignition voltage includes in part the voltage required to produce sufficient cathode emission to produce or sustain arc current and also the potential required for re-ionization of the arc atmosphere. These materials cooperate with both the electrode and workpiece to increase the thermionic emission thereof during the corresponding portions of the alternating current cycle when they act, respectively, as the arc cathode and function in the arc atmosphere to foster ionization. With cold cathode materials a high initial voltage is necessary to first produce a transition glow discharge current which then increases to normal arc current at a considerably lower potential. As before mentioned, a thermionic material continues to emit electrons even after arc extinction due to thermal lag. It has been found that an emission agent delivered to the alternating current arc according to the present invention need produce only sufficient thermionic emission from the cold cathode electrode wire and workpiece to exceed glow discharge-arc transition emission, in order to eliminate the need for an initial high striking voltage. Thereupon full arc current discharge may be established and maintained at normal low open circuit voltage without the provision of high glow discharge voltage. When a relatively easily ionizable gas and one having a relatively slow rate of de-ionization such as argon is used as the gas shield, the re-ignition voltage is dependent primarily upon the potential required for current emission. However, when a shielding gas such as helium is used which is not readily ionized and which de-ionizes rapidly during the brief interval of arc extinction, the re-ignition voltage is also largely dependent upon the ionization potential of the arc gap. Then the capacity of the emission agent to readily ionize in the arc atmosphere is considerably important in addition to its ability to increase thermionic emission in stabilizing the arc. Figures 10 and 11 in the drawings illustrate the effect of the emission agent delivered to the arc in accordance with the invention on the re-ignition arc voltage of the alternating current arc. These figures are reproductions of oscilloscope traces of the arc voltages occurring in an inert gas shielded alternating current metal arc welding operation with cold cathode materials. The arc voltage traces are illustrative, for example, of a weld made with an aluminum electrode and workpiece such as in Example IV herein. Figure 10 corresponds to a welding operation performed without the benefit of an addition material according to the present invention. In order to strike and maintain an arc, a high open circuit voltage of 150 volts was used. It will be seen that the start of each half cycle corresponding to reversal of the arc current a peak occurs in the arc voltage trace. This peak represents the high re-ignition voltage required in the "sterile" atmosphere which prevails under these conditions. The high open circuit voltage is sufficient to supply the peak voltage and the arc is thus sustained. Figure 11 corresponds to a welding operation performed in accordance with the invention such as in Example IV wherein an addition of rubidium carbonate was made to the aluminum wire. The weld was made under an argon gas shielding atmosphere. In making the oscilloscope trace, a high open circuit voltage of 150 volts was again used. Under these conditions it is seen that the peak re-ignition voltage is effectively reduced and the peak arc voltage required does not exceed 75 volts. Thus, with the addition material delivered to the arc in accordance with the invention, the arc may be struck and sustained with a normal low open circuit voltage of 75 volts. It will be noted, particularly upon reference to these oscillograms, that the effect of the addition material must exist at both the electrode wire and the workpiece in order to permit re-striking of the arc at low open circuit voltages. When, therefore, reference is made herein to the action or effect of the emission agents of this invention on the cathode it is to be understood that such action or effect must prevail at both the electrode wire and the workpiece which alternately become the arc cathode during successive half cycles. When a less readily ionizable shielding gas such as helium is used substantially the same effect is produced in the arc voltage oscillogram as illustrated in Figure 11 due to the ionization in the arc atmosphere of the emission agent.

The same addition materials are not equally effective on all workpiece and electrode wire compositions. While all the principles or theory of operation of the invention may not yet be fully understood, the following explanation of the manner in which the invention works has been found in practice to be useful as a guide to determine which of the various additional materials and emission agents to use, in the welding of a particular workpiece base metal or with a particular wire electrode base metal, to accomplish the desired results. The addition materials of the present invention are materials that break down (if a compound) into a metallic emission agent or element, of low work function and low ionization potential, which is electropositive with respect to the cathode base metal and which provides a thin film over all or part of the cathode (electrode and workpiece) surface during the welding operation. The coating of an electropositive metal on a more electro-negative one produces a marked lowering of the work function of the composite surface, resulting in effect in increased thermionic emission at welding electrode temperature. When the increased thermionic emission thus produced is sufficient, during arc extinction and reversal in the alternating current arc, to exceed the transition glow discharge-arc emission the arc is readily re-ignited at low open circuit voltages. The process is believed to proceed as follows. The compound containing the emission agent or element (assuming the emission agent is added to the arc in the form of a compound) is reduced or disassociated and frees the emission agent as a metal in or on the molten portion of the welding cathode (wire and workpiece surfaces). The emission element diffuses to the molten cathode surface and/or migrates over said surface to form a composite, highly thermionically emissive, welding cathode surface. It appears that the fully activated surface corresponds to a monatomic layer of atoms or ions of the emission agent which covers a large part of the cathode surface. This thin layer of the emission element is held on the surface with attractive forces so strong that substantial evaporation does not begin until temperatures are reached that are well above the boiling point of the emission element, though excess quantities of the element may evaporate at low temperatures to leave said thin layer or patches of the element on the cathode surface. It should be noted that the temperatures of the welding arc, usually operated at atmospheric pressures, are above the dissociation points of most compounds. The monatomic layer or patches of atoms of the emission element is believed adsorbed as ions on the base metal cathode surface and the forces which tend to hold it in place should be highest when the ionization potential of the emission element is low; it would appear that the ionization potential of the emission element should be less than the work function of the cathode base metal but in practice, possibly because work functions are difficult to determine accurately, it has been found that the ionization potential of the emission metal may sometimes be as high as one and one-half electron volts greater than the values given by reliable investigators for cathode base metal work functions. In general, the emission element must be electropositive with respect to the base metal; the work function of the composite surface is lowest and its thermionic emissivity is highest when this difference is at its largest positive value and the work function becomes higher and thermionic emissivity lower as the difference reaches zero and becomes negative.

Ionization potentials of many of the emission elements included in this invention have been determined with reasonable accuracy but, as stated above, there is a fairly wide variation in the work functions of the base metal as measured by different investigators. The following is a list, taken from the literature, of ionization potentials of some of the emission elements and work functions of several base metals:

*Ionization potentials*

| Emission agents: | Electron volts |
|---|---|
| Lithium | 5.37 |
| Sodium | 5.12 |
| Potassium | 4.32 |
| Rubidium | 4.16 |
| Cesium | 3.87 |
| Strontium | 5.67 |
| Barium | 5.19 |
| Scandium | 6.7 |
| Yttrium | 6.5 |
| Lanthanum | 5.59 |
| Thorium | 5.25 |

*Thermionic work functions*

| Base metals: | Electron volts |
|---|---|
| Magnesium | 3.78 |
| Aluminum | 4.08 |
| Copper | 4.33 |
| Iron | 4.48 |

While cesium would appear to provide the best thermionic composite surface emitter for any of the base metals on the basis of the above list, cesium has a low boiling point and is not retained well on the higher boiling base metals such as iron during welding conditions. Cesium is very effective to increase thermionic emission on the lower boiling metals such as aluminum. Barium, strontium, lanthanum and cerium would be expected to be much more effective as composite surface thermionic emitters with iron than with aluminum and this has been shown to be true by actual test. Those emission agents having the lower ionization potentials are particularly beneficial when used with shielding gases such as helium having relatively poor ionization characteristics.

Usually only the emission agent can be selected for the composite surface when the present invention is applied to practical operations, because the cathode base metal is determined by the electrode wire composition or the workpiece composition, which in turn is determined by the type of weld to be made or the type of work to be welded. Furthermore, the cathode surface must operate at some temperature between the melting and boiling points of the wire compositions, so that the electrode wire metal may be melted and transferred across the arc gap and deposited in the molten weld metal on the workpiece.

The fact that welding arcs are normally operated at substantially atmospheric pressure is a factor to be considered because the boiling point of the emission agent should be high, to keep it intact on the cathode surface for a sufficient length of time, and the temperatures and boiling points to be considered should therefore be those at atmospheric pressure. Because the addition material is continuously fed to the arc the emission element on the composite cathode surface is continuously replenished and hence need have only a short effective life; emission agents that have boiling points considerably below the welding cathode temperatures can, if continuously added to the arc, act to maintain a constantly effective, thermionic composite cathode surface, even though the cathode base metal is rapidly being removed or added to during the welding operation by the transfer of metal from the electrode wire to the weld deposit on the workpiece.

The activation treatment (reduction or dissociation of the addition material if in compound form and migration of the emission element over the cathode surface in a monatomic layer) must take place as the wire is fed into the arc. It is important that the emission element chosen be capable of being held in a thin adsorbed layer on the base metal at its welding temperature because it is at such temperature (between the base metal melting and boiling temperatures) that the welding cathode surface operates and therefore it is at such temperature that the composite surface must be effective. If the addition material is fed into the arc in compound form such compound should not be so stable that it will not dissociate at least in part to provide the free emission element or metal at the electrode surfaces of the arc; on the other hand if a compound is used it preferably should not dissociate so readily as to permit complete evaporation of the emission element before it can reach the cathode surface and be adsorbed on the surface as ions. Where the addition material is a compound it can be considered as having an "effective end" which is the emission element and a "carrier end" which is the element or group that carries the emission element to its place in the composite surface.

Figure 9:
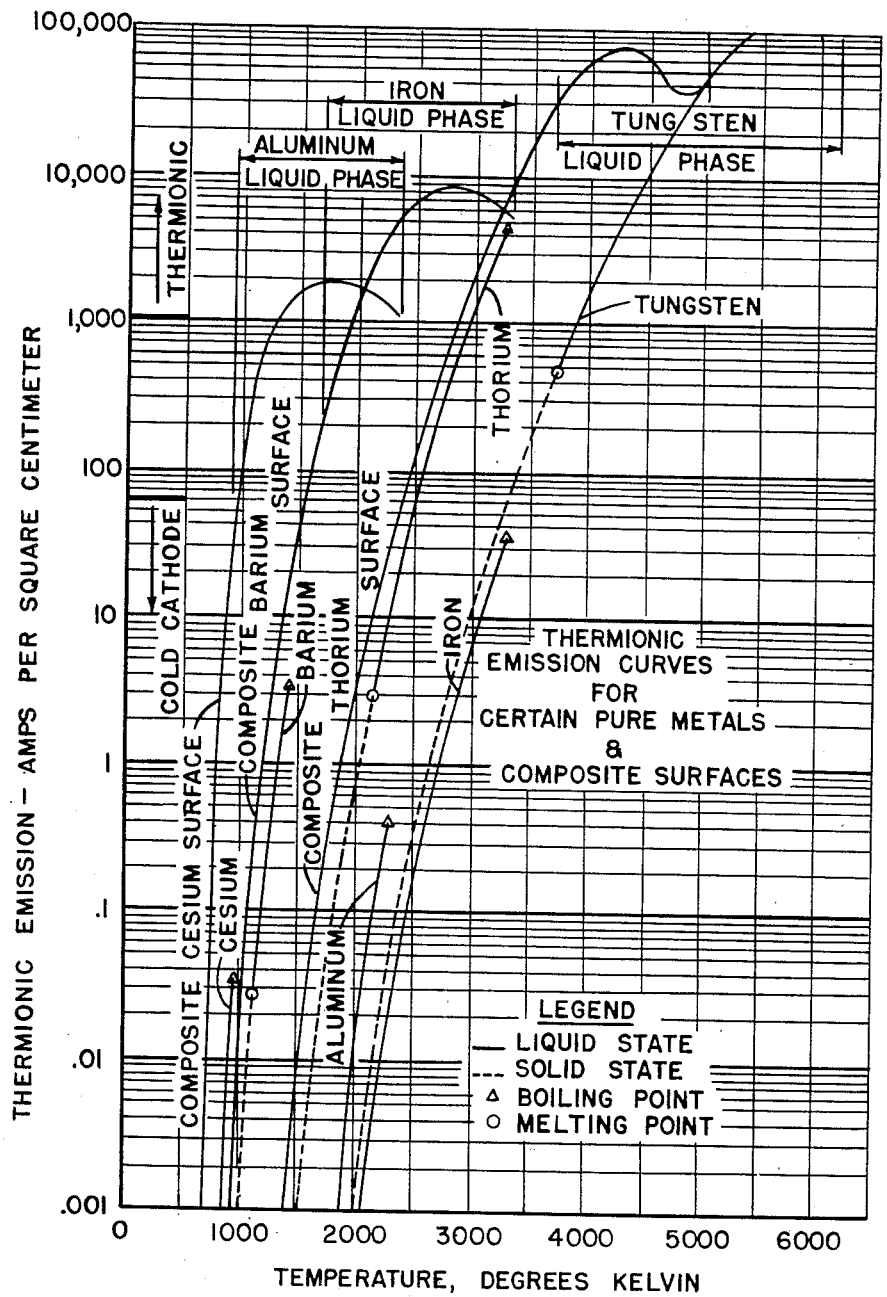
Fig. 9 shows qualitatively cathode thermionic emission rate plotted on an eight cycle log ordinate against cathode temperature on a linear abscissa for certain cathode materials and composite cathode surfaces.

To illustrate the effect of composite cathode surfaces for controlling and improving thermionic electron emission in the welding arc, a chart is shown in Figure 9. In this figure thermionic emission rates of two base metals (aluminum and iron) and two emission agents (cesium and barium) are plotted against temperature. The composite surface thermionic emission from cesiated and bariated cathode surfaces are also plotted to illustrate the principle involved. It must be emphasized that these curves are merely illustrative of one aspect of the invention relating to increasing thermionic emission and are not quantitatively exact. They illustrate qualitatively the relation between the thermionic emission rates of various surfaces but the quantitative relationships shown are not exact as the work function of a composite cathode surface varies with base metal composition, as well as with the emission element used. The work function of a thermionic composite surface is lower than that of either the base metal or the emission element per se. While the coating metal or emission agent is held in an adsorbed layer on the base metal far above its boiling temperature, if high enough temperatures are reached the adsorbed layer is lost too quickly, due to evaporation and in such case the thermionic emission is substantially identical to that of the base metal alone. The emissivity curve for the refractory and thermionic metal tungsten and for thoria on tungsten is included to show this effect. At the top of the chart the melting and boiling points for aluminum and iron are indicated. Since the electrode temperatures of the welding arc for these materials must lie within the ranges indicated in the inert gas shielded metal arc welding process, it is apparent that cesium would be most effective, for promoting thermionic emission on aluminum and barium most effective on iron.

While it is presently preferred to practice the invention by applying or embedding the addition materials to or in the wire surface or by adding these materials to the wire composition as an integral part thereof, these addition materials can also be added to the arc in other ways.

Figure 6:
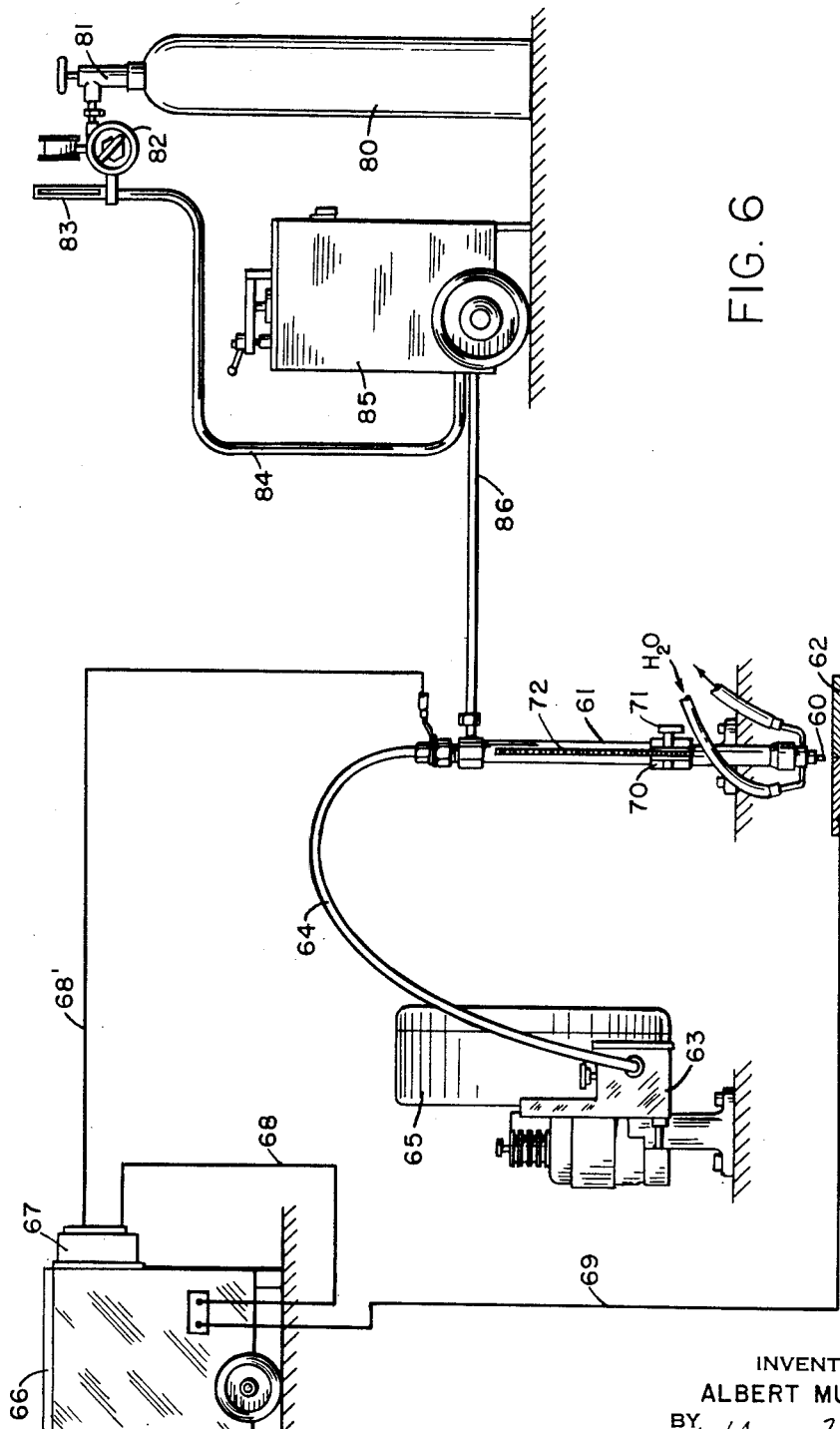
Fig. 6 illustrates a modified apparatus set-up suitable for the practice of the invention.

Figure 6 illustrates diagrammatically one such alternative in which the addition materials are introduced continuously into the shielding gas stream. In this figure an untreated wire electrode 60 is fed through a welding gun 61 to operative position with respect to work 62. In the same manner as previously described for the manual gun the electrode wire 60 is provided on a reel 65 from which it is withdrawn by a motor driven wire feed mechanism 63. The wire is then pushed through a casing 64 to the welding gun 61. Welding current is provided by a conventional alternating current welding transformer 66. One terminal of the transformer is connected to the welding gun 61 through a contactor 67 and conductors 68 and 68'. The other terminal of the welding transformer is connected to the work 62 by conductor 69. The welding current is transferred to the electrode 60 within the gun 61 by a contact tube in the same manner as in the gun of Figure 2. The welding gun may be water cooled, as indicated by the cooling water connections on the nozzle. The welding gun illustrated is supported in a fixed holder comprising a split sleeve 70 having a pinion gear rotatable by means of hand wheel 71. A rack 72 is attached to the barrel of gun 61 so as to engage the pinion gear enabling the gun to be adjusted vertically within the split sleeve. Figure 7 illustrates in some detail the construction of the lower portion of the gun 61. The wire is fed through an inner barrel 75 and a contact tube 76 which transfers the welding current to the electrode 60. The welding current enters the gun at the top from conductor 68' and is conducted through the internal metal parts of the gun to the contact tube 76.

Referring again to Figure 6, shielding gas is supplied from a compressed gas cylinder 80. It is discharged from the cylinder through the conventional cylinder valve 81, pressure regulator 82, and flow meter 83 into conduit 84. From conduit 84 the shielding gas is discharged into a vibratory powder dispensing device 85. This device is disclosed in detail in United States Patent No. 2,549,033, issued April 17, 1951, to Joseph M. Tyrner. Basically it consists of a hopper from which the powdered material is dispensed by a vibratory dispensing mechanism. The powdered material is picked up by the inert gas stream as the gas, which was fed to the device from conduit 84, leaves the device in conduit 86. Shielding gas with suspended powdered material passes through conduit 86 from the powder dispenser 85 to the welding gun 61. In this form of the invention the addition material is provided in the form of a dry powdered solid which is introduced into the shielding gas stream. The shielding gas, with the addition material suspended therein, passes through the appropriately provided passages of gun 61 and emerges as a non-turbulent stream from the annular nozzle 89 (Figure 7) surrounding contact tube 76. The addition material suspended in the shielding gas stream continuously enters the arc region to provide therein a stabilizing substance of low ionization potential and to impart to the arc cathode surfaces thermionic emissive properties as described heretofore. The powder dispensing device 85 need not be of the type disclosed in Tyrner Patent No. 2,549,033 but may be any apparatus which will provide a continuous feed of powder to the arc.

EXAMPLE V

The following is an example of the operation and results of the invention when the addition material is added to the arc as a dust suspended in the shielding gas. A mild steel ⅜ inch thick plate was welded utilizing a 1⁄16 inch diameter untreated wire of the same composition. A protective gas shield was provided by delivering argon at 75 cubic feet per hour through a 1 inch diameter nozzle. Barium oxide in the form of a fine powder was carried to the arc in the shielding gas. With 75 volts open circuit voltage, 300 amperes arc current and an arc voltage of 19 volts the wire burn off rate of the bare untreated wire was 130 inches per minute. The weld travel speed was maintained at 10 inches per minute.

The operation carried out in this manner resulted in a stabilized alternating current arc operable at a low open circuit voltage of 75 volts. A good alternating current type spray transfer was observed with good regulation.

EXAMPLE VI

A similar test was made using helium as a protective gas shield delivered at a flow of 100 cubic feet per hour through a 1 inch diameter nozzle. Barium oxide in the form of a fine powder was delivered to the arc in the shielding gas in the same manner as above. With a 75 volt open circuit voltage, 270 amperes arc current and 30 volts arc voltage, the wire burn off rate was 150 inches per minute.

The operation carried out in this manner resulted in a stabilized alternating current arc operable at a low open circuit voltage of 75 volts. A fine drop transfer was observed with good regulation. A medium amount of spatter was apparent and the weld bead was fairly flat.

Beside the above-described modes of introducing the addition material to the arc for the purposes herein described, it has been found that the addition material can be put on an auxiliary filler wire that is fed to the weld, or the addition material may be placed on the work directly.

Figure 8:
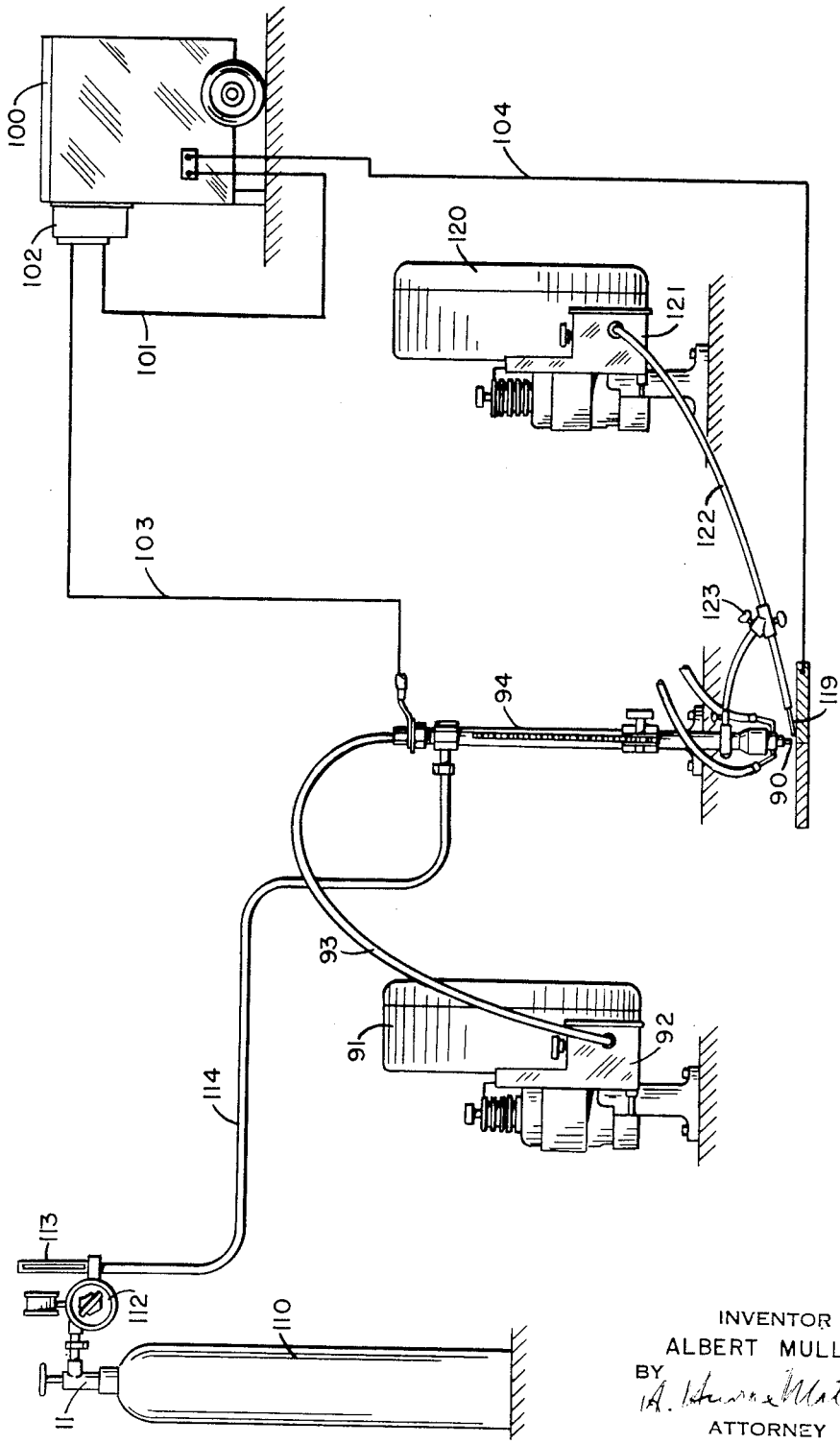
Fig. 8 illustrates another modified apparatus set-up suitable for the practice of the invention.

Figure 8 illustrates suitable apparatus employing an auxiliary filler wire to which addition materials of the type hereinbefore described have been applied.

Referring to Figure 8 electrode wire 90 is fed from a reel 91 by a motor-driven feed mechanism 92 as in the previously-described embodiments. In this case the electrode is clean bare untreated wire. It is guided from the feed mechanism 92, through a casing 93 to a welding gun 94 of the machine type. This welding gun may be identical in itself to the gun disclosed in Figures 6 and 7 and described herein. The welding current is provided from a welding transformer 100. One terminal of the transformer is connected to the welding gun by conductor 101, contactor 102, and conductor 103. The current is transferred to the electrode wire 90 within the welding gun 94. The other terminal of the welding transformer is connected to the work by conductor 104. Shielding gas is provided from a compressed gas cylinder 110 through a conventional cylinder valve 111, pressure regulator 112, flow meter 113, and conduit 114 to the welding gun 94. The shielding gas emerges from the gun nozzle as a non-turbulent flow stream enveloping the arc end of the electrode, the arc, and the weld puddle. A second wire feed unit is employed in this embodiment of the invention to feed a filler wire 119 to the weld, which wire contains in the body of the wire or on or embedded in its surface, the necessary addition material. This treated wire 119 is not electrically energized and is not an electrode. It is an independent wire fed to the arc region where it is melted into the weld by the heat of the arc. The wire feed unit may be identical to the electrode wire feed unit. It comprises a wire reel 120 and a motor-driven wire feed mechanism 121. The feed mechanism withdraws the wire 119 from reel 120 and pushes it through a casing 122 to the weld zone. A fixture 123 supports the casing 122 in the vicinity of the torch and thereby guides the filler wire 119 into the weld. Best results are obtained if the filler wire 119 is fed to the weld zone in such a manner that the end of the wire touches the work at the edge of the weld puddle and melts off in the weld puddle before it gets directly under the arc.

EXAMPLE VII

The following example shows the effect produced on an alternating current inert gas shielded metal arc with an addition made to an auxiliary filler wire. With apparatus as shown in Figure 8 a 1/16 inch diameter mild steel wire was used in an argon gas shield with a gas flow rate of 75 cubic feet per hour through a 1 inch diameter nozzle. The workpiece consisted of a 3/8 inch thick mild steel plate. An auxiliary filler wire comprising a 0.045 inch diameter steel wire was treated with barium oxide in exactly the same manner hereinbefore described in Example I for treating a 1/16 inch steel electrode with rubidium carbonate. The auxiliary wire was fed to the arc to melt off in the weld puddle and supplement the weld metal provided by the consuming electrode. When the arc was struck and this barium oxide treated wire was added to the weld at a feed rate of 90 inches per minute, with an open circuit voltage of 75 volts, an arc voltage of 29 volts and an arc current of 370 amperes the burn off rate of the electrode was 320 inches per minute. The weld travel speed was maintained at 10 inches per minute.

The operation carried out in this manner resulted in a stabilized alternating current arc operable at a low open circuit voltage of 75 volts. A good alternating current type spray transfer was observed with fair regulation.

When the barium oxide was supplied by addition to the auxiliary filler wire as above it was not possible to strike the arc in the usual manner. This is due to the fact that the addition material on the filler wire is not effective to promote emission or to stabilize the arc until the filler wire has been melted or the arc struck. Satisfactory starting was obtained by coating a small area of the workpiece at the starting point of the weld with an alcohol solution of the stabilizing material. Once started the arc is maintained without interruption by continuous feeding of the treated auxiliary filler wire.

EXAMPLE VIII

The invention can also be practiced by applying an addition material directly to the plate. For example, using apparatus of the type disclosed in Figure 1, a slurry of rubidium carbonate and alcohol was applied by brush to a portion of a 3/8 inch thick steel plate to be welded. The weld was made with a 1/16 inch diameter untreated mild steel wire. An inert gas shield was provided by delivering argon at 75 cubic feet per hour through a 1 inch diameter nozzle. With an arc current of 310 amperes, an arc voltage of 27 volts and an open circuit voltage of 75 volts, the wire burn off rate was 250 inches per minute. The weld travel speed was maintained at 10 inches per minute.

The operation carried out in this manner resulted in a stabilized alternating current arc operable at a low open circuit voltage of 75 volts. A good alternating current type spray transfer was observed with good regulation. A well rounded bead was formed.

While certain specific examples and embodiments of the invention have been described above for the purpose of illustrating its nature and operation, it is to be understood that the invention may also be utilized and practiced by those skilled in the art in other ways without departing from its spirit or scope as defined by the following claims.

I claim:

1. A method of electric arc welding comprising supplying alternating current to a consuming wire electrode and a workpiece, feeding said wire toward said workpiece to maintain said arc as metal is transferred from said electrode to said workpiece, shielding the end of said electrode, the arc, and the molten metal produced thereby with a flowing stream of inert gas, and supplying to said arc a substance comprising a metal selected from the group consisting of the alkali metals, the alkaline earth metals, lanthanum and the lanthanum series rare earth metals, actinium and the actinium series rare earth metals, scandium, and yttrium.

2. A method of electric arc welding comprising supplying alternating current to a consuming wire electrode and a workpiece, feeding said wire toward said workpiece to maintain said arc as metal is transferred from said electrode to said workpiece, shielding the end of said electrode, the arc, and the molten metal produced thereby with a flowing stream of inert gas, and supplying to said arc a substance comprising a metal that is electro-positive with respect to the base metal of the terminals of said arc and has a lower work function than said base metal and that is selected from the group consisting of the alkali metals, the alkaline earth metals, lanthanum and the lanthanum series rare earth metals, actinium and the actinium series rare earth metals, scandium, and yttrium.

3. In a process for gas shielded metal arc welding wherein an electrode wire having an electrically conductive surface is continuously consumed by an inert gas shielded welding arc maintained by alternating current continuously supplied to said wire electrode through its conductive surface at a location adjacent the arc end thereof, the improvement which comprises continuously introducing into said arc as said wire electrode is consumed thereby a substance selected from the group consisting of the alkali metals, the alkaline earth metals, lanthanum and the lanthanum series rare earth metals, actinium and the actinium series rare earth metals, scandium, and yttrium, said substance being introduced in the form of a compound that breaks down in the arc region to produce composite surfaces at the terminals of the arc whereby composite surface emission occurs during the periods the respective terminals of the arc are negative to effect an axial projected spray of metal from said electrode wire within the inert gas shield.

4. In a gas shielded metal arc welding process in which an alternating current arc is maintained between a consuming ferrous metal wire electrode and a ferrous workpiece, and the end of the electrode, the arc and the weld puddle formed by the arc are shielded from the ambient atmosphere by a flowing stream of inert gas, the improvement which comprises supplying to the region of said arc a compound of a metal which is electropositive with respect to the base metal of the terminals of said arc, which has a lower work function than the base metal of the terminals of said arc, and which is selected from the group consisting of potassium, rubidium, cesium, strontium, barium, lanthanum, and cerium, said compound dissociating in the region of said arc to produce composite surfaces at the terminals of said arc having substantially increased thermionic emissivity as compared with the thermionic emissivity of the base metal of the terminals of the arc alone.

5. A method of electric arc welding comprising supplying alternating current to a workpiece and a consuming wire electrode, said workpiece and wire electrode being composed of metal selected from the group consisting of aluminum, copper, nickel, iron, magnesium, titanium, and alloys of said metals, feeding said wire electrode toward said workpiece at a rate of the order of 100 inches or more per minute to maintain said arc as metal is transferred from said electrode to said workpiece, shielding the end of said wire electrode, the arc, and the molten weld metal produced thereby with a flowing stream of argon, and continuously adding to the molten metal at the terminals of said arc during the welding process a metal selected from the group consisting of potassium, rubidium, cesium, strontium, barium, lanthanum, and cerium, to produce a projected spray of metal droplets having a diameter less than the diameter of said wire electrode axially from said wire electrode to said workpiece.

6. A process for welding metals selected from the group consisting of aluminum, nickel, copper, iron, magnesium, and titanium, which comprises establishing an alternating current inert gas shielded welding arc between a bare wire consumable electrode composed of at least one of said metals and a workpiece, continually feeding to the molten metal at the arc end of said electrode a carrier compound containing an arc control metal which is liberated at the electrode terminal of said arc by dissociation of said carrier compound in the heat of the arc, said control metal being electropositive with respect to said electrode metal and having a lower work function than said electrode metal and being selected from the group consisting of the alkali metals, the alkaline earth metals, lanthanum and the lanthanum series rare earth metals, actinium and the actinium series rare earth metals, scandium, and yttrium.

7. A method of electric arc welding with a bare wire consuming electrode connected to a source of welding current wherein an arc is struck between said electrode and a metal workpiece connected to said source and an inert gaseous medium is simultaneously fed to shield the arc, characterized by feeding the wire electrode toward the arc at a rate of at least 100 inches per minute, introducing into said arc region a substance comprising a metal selected from the group consisting of the alkali metals, the alkaline earth metals, lanthanum and the lanthanum series rare earth metals, actinium and the actinium series rare earth metals, scandium, and yttrium, and simultaneously supplying alternating current from said source to the electrode and workpiece at a strength sufficient to both consume the wire electrode at said rate and also project molten metal axially from the wire electrode to the workpiece in the form of a spray of fine discrete droplets within the gas shield.

8. A process for welding materials selected from the group consisting of aluminum, nickel, copper, iron, magnesium, titanium, and alloys of said metals, which comprises establishing an alternating current welding arc between a consumable wire electrode of one of said materials and a workpiece of substantially the same material, whereby both said electrode and said workpiece alternately function as the arc cathode, shielding the end of said electrode, the arc, and the molten weld metal produced thereby with a flowing stream of inert gas, continually feeding to at least one of the arc cathode surfaces a carrier compound containing an arc control metal which is liberated at the arc by dissociation of said carrier compound in the heat of the arc, said control metal being electropositive with respect to the weld metal and having a lower work function than said weld metal and being selected from the group consisting of the alkali metals, the alkaline earth metals, lanthanum and the lanthanum series rare earth metals, actinium and the actinium series rare earth metals, scandium, and yttrium, and supplying alternating current to said arc at a strength to maintain said arc and project molten metal axially from said electrode to the workpiece in the form of a spray of fine discrete droplets within the inert gas shield.

9. A process for inert gas shielded alternating current electric arc welding in which a welding arc formed between a consuming electrode and a workpiece is shielded from the ambient air by inert gas, characterized by delivering to the arc atmosphere as an ingredient in said shielding gas a substance comprising a metal selected from the group consisting of the alkali metals, the alkaline earth metals, lanthanum and the lanthanum series rare earth metals, actinium and the actinium series rare earth metals, scandium, and yttrium.

10. A method of welding metals which comprises establishing an alternating current welding arc between a consumable depositing electrode and a workpiece, feeding the electrode toward the workpiece at a controlled rate as the electrode is consumed, delivering a stream of inert shielding gas to the welding zone around the electrode so that it forms a protective shield for the welding zone, delivering to the arc a substance comprising a metal selected from the group consisting of the alkali metals, the alkaline earth metals, lanthanum and the lanthanum series rare earth metals, actinium and the actinium series rare earth metals, scandium, and yttrium, said substance being delivered at a predetermined rate relative to the feed of said electrode.

11. The method of welding metals which comprises establishing an alternating current electric arc between a consuming electrode and a workpiece, feeding the electrode toward the workpiece as the electrode is consumed, delivering to the welding zone a stream of inert shielding gas and introducing into the welding zone a substance comprising a metal selected from the group consisting of the alkali metals, the alkaline earth metals, lanthanum and the lanthanum series rare earth metals, actinium and the actinium series rare earth metals, scandium, and yttrium, said material being effective to concentrate the arc cathode spot and substantially improve the transfer of metal from said electrode to said workpiece.

12. A method of electric arc welding comprising striking a low open circuit voltage alternating current arc between a bare consumable ferrous electrode and a ferrous workpiece, delivering a stream of inert shielding gas to the welding zone so that it forms a protective shield around the welding zone, feeding said electrode to the arc as it is consumed, and continuously supplying to the arc a substance comprising a metal selected from the group consisting of potassium, rubidium, cesium, strontium, barium, lanthanum, and cerium to improve metal transfer and reduce the arc re-ignition voltage sufficiently for arc operation at said low open circuit voltage.

13. A method of electric arc welding comprising striking a low open circuit voltage alternating current arc between a bare consumable non-ferrous electrode and a non-ferrous workpiece, delivering a stream of inert shielding gas to the welding zone so that it forms a protective shield around the welding zone, feeding said electrode to the arc as it is consumed, and continuously supplying to the arc a substance comprising a metal selected from the group consisting of potassium, rubidium, cesium, strontium, barium, lanthanum, and cerium to improve metal transfer and reduce the arc re-ignition voltage sufficiently for arc operation at said low open circuit voltage.

14. A fluxless arc welding method comprising applying an alternating current potential from a welding current source having a nominal rating of not substantially more than 75 volts open circuit to a continuous bare consuming metal electrode and a workpiece for establishing a welding arc between said electrode and said workpiece, continuously feeding said electrode toward said workpiece at a rate of at least 100 inches per minute to maintain said arc as metal is transferred from said electrode to said workpiece, shielding the arc end of said electrode, the arc, and the molten weld metal produced thereby with a flowing stream of inert gas, and continuously supplying to said arc a small quantity of a substance comprising a metal selected from the group consisting of potassium, rubidium, cesium, strontium, barium, lanthanum, and cerium to maintain a stable arc and promote the transfer of said metal from said electrode to said workpiece in the form of a uniform axial spray of fine discrete droplets within the gas shield.

15. A fluxless arc welding method comprising applying an alternating current potential from a welding current source having a nominal rating of not substantially more than 75 volts open circuit to a continuous bare consuming metal electrode and a workpiece for establishing a welding arc between said electrode and said workpiece, said electrode and workpiece being comprised of a common structural metal such as aluminum, copper and iron, continuously feeding said electrode toward said workpiece at a rate of at least 100 inches per minute to maintain said arc as metal is transferred from said electrode to said workpiece, shielding the arc end of said electrode, the arc, and the molten weld metal produced thereby with a flowing stream of argon gas, and continuously supplying to said arc a small quantity of a substance comprising a metal selected from the group consisting of potassium, rubidium, cesium, strontium, barium, lanthanum, and cerium.

16. A method of electric arc welding with a bare wire consuming electrode comprising essentially iron connected to a source of welding current wherein an arc is struck between said electrode and a metal workpiece connected to said source and argon gas is simultaneously fed to shield the arc, characterized by feeding the wire electrode toward the arc at a rate of at least 100 inches per minute, introducing into the arm region a substance comprising rubidium and simultaneously supplying alternating current from said source to said electrode and workpiece at a strength sufficient to both consume the wire electrode at said rate and also project molten metal axially from the wire electrode to the workpiece in the form of a spray of fine discrete droplets within the gas shield.

17. A method of electric arc welding with a bare wire consuming electrode comprising essentially aluminum connected to a source of welding current wherein an arc is struck between said electrode and a metal workpiece connected to said source and argon gas is simultaneously fed to shield the arc, characterized by feeding the wire electrode toward the arc at a rate of at least 100 inches per minute, introducing into the arc region a substance comprising cesium and simultaneously supplying alternating current from said source to said electrode and workpiece at a strength sufficient to both consume the wire electrode at said rate and also project molten metal axially from the wire electrode to the workpiece in the form of a spray of fine discrete droplets within the gas shield.

18. An inert gas shielded alternating current metal arc welding process in which a welding arc of the spray-transfer type is maintained in an inert gaseous atmosphere between a workpiece and the arc end of a continuously fed consumable electrode having an electrically conductive surface through which the welding current is supplied to the electrode at a location adjacent the arc end thereof and which is comprised of weld metal to be deposited on the workpiece by the action of the arc, the cathode of said arc during the straight polarity portion of the alternating current cycle being a composite surface cathode located on the arc end of said consumable electrode and comprising a molten body of said electrode weld metal and an arc control metal selected from the group consisting of the alkali metals, the alkaline earth metals, lanthanum and lanthanum series rare earth metals, actinium and the actinium series rare earth metals, scandium, and yttrium.

19. An inert gas shielded alternating current metal arc welding process in which a welding arc of the spray-transfer type is maintained in an inert gaseous atmosphere between a workpiece and the arc end of a continuously fed consumable electrode having an electrically conductive surface through which the welding current is supplied to the electrode at a location adjacent the arc end thereof and which is comprised of a common structural metal such as aluminum, copper, and iron to be deposited as weld metal on the workpiece by the action of the arc, the cathode of said arc being a composite surface cathode located alternately on said electrode and on said workpiece in accordance with alternations of the welding current and comprising a molten body of weld metal and an arc control metal which cooperate to form a composite thermionic emitter which has a thermionic emission rate at the welding temperature which is not substantially less than 1000 amperes per square centimeter, said arc control metal being selected from the group consisting of potassium, rubidium, cesium, strontium, barium, lanthanum, and cerium.

20. An inert gas shielded alternating current metal arc welding process in which a welding arc of the spray-transfer type is maintained in an inert gaseous atmosphere between a workpiece and a continuously fed consumable electrode composed predominately of a metal selected from the group consisting of iron and aluminum, the cathode of said welding arc being a composite surface cathode located alternately on said workpiece and said electrode in accordance with alternations of the welding current and comprising a molten body of said electrode metal having an element selected from the group consisting of rubidium and cesium retained as an essential active cathodic constituent thereof.

References Cited in the file of this patent

UNITED STATES PATENTS

| Number | Name | Date |
|---|---|---|
| 1,501,266 | Brace | July 15, 1924 |
| 1,977,278 | Judy | Oct. 16, 1934 |
| 2,053,417 | Brace | Sept. 8, 1936 |
| 2,473,601 | Lobosco | June 21, 1949 |
| 2,504,868 | Muller | Apr. 18, 1950 |
| 2,510,205 | Baird | June 6, 1950 |
| 2,515,559 | Lancaster | July 18, 1950 |
| 2,540,811 | Cobine | Feb. 6, 1951 |
| 2,544,711 | Mikhalapov | Mar. 13, 1951 |

OTHER REFERENCES

"Stability of the Welding Arc," by P. Alexander, Journal of the A. I. E. E., pp. 109–112, February 1928.